No. 774,985. PATENTED NOV. 15, 1904.
A. T. JONES.
VALVE.
APPLICATION FILED OCT. 22, 1900.
NO MODEL.
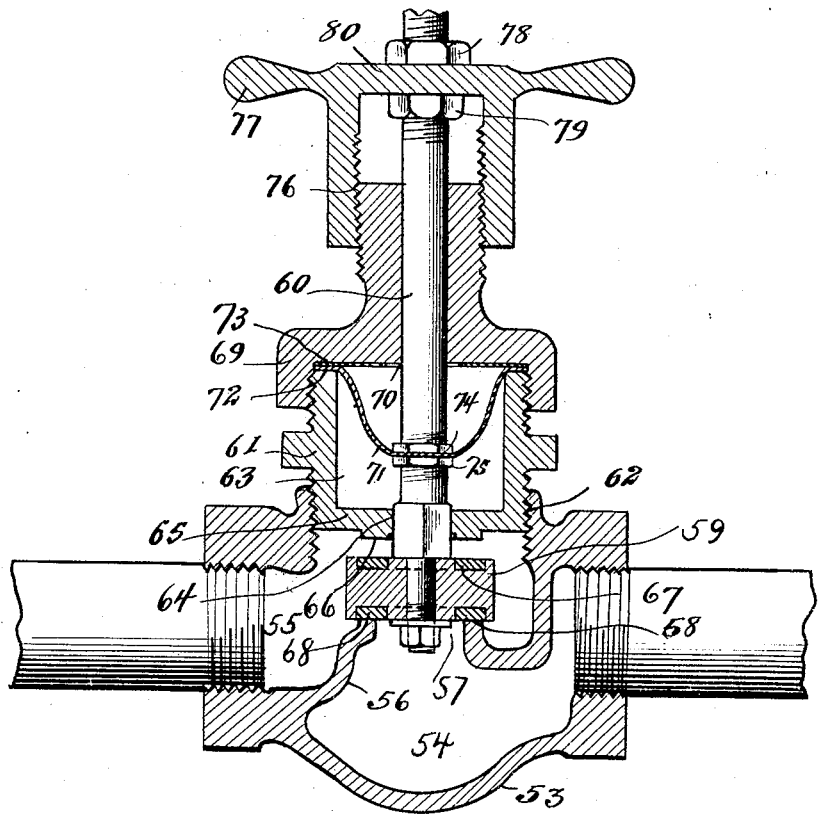

No. 774,985.

Patented November 15, 1904.

UNITED STATES PATENT OFFICE.

AMANDA T. JONES, OF JUNCTION CITY, KANSAS.

VALVE.

SPECIFICATION forming part of Letters Patent No. 774,985, dated November 15, 1904.

Application filed October 22, 1900. Serial No. 33,918. (No model.)

*To all whom it may concern:*

Be it known that I, AMANDA T. JONES, of Junction City, county of Geary, and State of Kansas, have invented certain new and useful Improvements in Valves, of which the following is a specification.

This invention relates to improvements in valves, and refers more specifically to an improved valve of the general type known as "globe-valves," or those designed to control the passage of fluid through a pipe or analogous passage.

The object of the invention is to provide a valve having special means for securing an absolutely tight packing or joint through which the operating member of the valve extends, thereby enabling the valve to be operated, while at the same time leakage either into or out of the body or valve-casing is absolutely precluded.

The invention consists in the matters hereinafter described, and more particularly pointed out in the appended claims, and will be readily understood from the following description, reference being had to the accompanying drawings, in which the figure is a view in axial section of a valve embodying my invention.

The valve illustrated in the present instance was particularly designed for use in conjunction with certain vacuum-process apparatus wherein the valve is subjected alternately to both internal and external atmospheric pressure; but the invention is in no sense limited to this particular application, but, on the contrary, is capable of widely-varying uses.

Referring to said drawing, 53 designates as a whole a valve-body, generally similar to the ordinary globe-valve body, and comprising chambers 54 55, separated by a partition or diaphragm 56, having a port 57 surrounded by a valve-seat 58 and controlled by a valve-plunger 59, mounted upon a reciprocatory stem 60, substantially in the manner of the ordinary globe-valve. The stem 60 of the valve is arranged to extend out through a gasket member 61, threaded within the body of the valve, as indicated at 62, and in order to provide a more perfect sealing of the joint between the stem and the parts through which it reciprocates the gasket member 61 and parts connected therewith are of peculiar and novel construction. The gasket member is made hollow or provided with a central chamber 63, open at its upper end, but closed at its lower end, except for the aperture 64 for the valvestem therethrough, and upon the lower face of the lower end wall 65 of said gasket member is formed a second valve-seat 66, facing oppositely to the valve-seat 58, hereinbefore referred to. The valve-plunger 59 is provided upon its opposite faces with packing-washers 67 68, adapted to coöperate with the respective seats to form a perfectly tight joint when the plunger is moved to one position or the other.

69 designates a cap member threaded to screw upon the upper end of the gasket member and provided with an axial bore 70 for the passage of the stem of the valve.

71 designates a circular flexible impervious diaphragm having its periphery clamped between the upper end margin of the gasket member and the opposing face of the cap member 69, as indicated at 72, an antifriction-washer 73 being interposed between said meeting parts in order to prevent strain upon and displacement of the diaphragm while the cap is being screwed to position. At the point where the stem of the valve passes through the diaphragm the latter is clamped between clamping-nuts 74 75, threaded upon said stem so as to form a hermetical joint at this point as well as at the periphery of the diaphragm.

In order to reciprocate the valve while at the same time it is held against rotation, the upper end of the cap member 69 is externally threaded, and upon this is arranged to fit a correspondingly-threaded hollow actuating-nut 76, conveniently provided with handles 77, whereby it may be manipulated and operatively connected with the valve-stem by means of nuts 78 79, threaded upon the stem at points respectively above and below the end wall 80 of said actuating-nut. It will be understood that the connection between the actuating-nut and the valve-stem is such as to permit rotation of the former without rotating the latter, and in order to hold said valve-stem positively against rotation that portion thereof which extends through the lower end of the gasket member 61 is made non-circular in cross-section, and the aperture through which it operates is correspondingly shaped.

It will be seen from the foregoing description that the valve-body remains perfectly sealed around the valve-stem, regardless of the position of the valve, whether it be fully opened or fully closed or occupying an intermediate position, the valve-plunger 59 acting to form a perfect closure when adjusted to either its fully opened or closed position by contact with its respective seats, and the diaphragm serving to maintain a hermetical joint at all times, regardless of the position of the valve-plunger.

I claim as my invention—

1. In a valve, the combination of a valve-body having two chambers and a port affording communication therebetween, a valve-disk arranged to control said port and provided with a valve-stem extending out through the valve-body, a flexible impervious diaphragm through which said valve-stem is arranged to extend, having its periphery hermetically attached to the valve-body, and its apertured portion through which the valve-stem extends hermetically attached to the latter, means for imparting a reciprocatory movement to the valve-stem, a valve-seat formed upon that portion of the valve-body through which said valve-stem reciprocates and immediately above said valve-disk, and a coöperating face upon the valve-disk operating to seal the joint around the valve-stem when the valve which controls the main port is in fully-opened position.

2. In a valve, the combination of a valve-body provided with a dividing-diaphragm having a port therethrough, a valve-disk arranged to control said port, and provided with a valve-stem extending out through the side of the valve-body, a hollow gasket member surrounding said valve-stem, a flexible impervious diaphragm through which said valve-stem is arranged to extend, having its periphery attached to the interior of said hollow gasket member and its apertured portion through which the valve-stem extends hermetically attached to the latter, means for imparting a reciprocatory movement to the valve-stem, a valve-seat formed upon that portion of the valve-body through which said valve-stem reciprocates and a valve member upon the valve-stem coöperating with said latter seat to seal the joint around the valve-stem when the valve which controls the main port is in fully-open position.

3. In a valve, the combination of a hollow valve body or casing provided with a diaphragm having a port therethrough, a valve-disk arranged to control said port, mounted upon a valve-stem arranged to extend out through the wall of the valve-body, a hollow cup-shaped gasket member surrounding said valve-stem and forming that part of the valve-body through which the valve-stem extends, a flexible impervious diaphragm arranged within said hollow gasket member and through which said valve-stem extends, having its central portion through which the valve-stem extends hermetically attached to the latter, a cup threaded upon the outer end of said gasket member and clamping the periphery of said diaphragm between itself and an opposing surface of said gasket to form a hermetical joint and an actuating-nut threaded upon said cap and having operative engagement with the valve-stem, substantially as described.

4. In a valve, the combination of a hollow valve body or casing, provided with a diaphragm having a port therethrough, a valve-disk arranged to control said port, mounted upon a valve-stem arranged to extend out through the wall of the valve-body, a hollow cup-shaped gasket member surrounding said valve-stem and forming that part of the valve-body through which the valve-stem extends, a second valve-seat formed upon the inner surface of said gasket member around the valve-stem, a coöperating valve-surface upon the proximate side of the valve-disk adapted to seal the joint around the valve-stem when the valve-disk is fully retracted or withdrawn from the main port, a flexible impervious diaphragm arranged within said hollow gasket member and through which the valve-stem extends, having its central portion through which the valve-stem extends hermetically attached to the latter, a cup threaded upon the outer end of said gasket member and clamping the periphery of said diaphragm between itself and an opposing surface of said gasket to form a hermetical joint and an actuating-nut threaded upon said cup having operative engagement with the valve-stem, and means for holding said valve-stem against rotation while permitting it to reciprocate, substantially as described.

AMANDA T. JONES.

Witnesses:
ALBERT H. GRAVES,
FREDERICK C. GOODWIN.